March 7, 1933.  C. H. DESAUTELS  1,900,435
TIRE BUILDING METHOD
Original Filed March 30, 1928  2 Sheets-Sheet 1
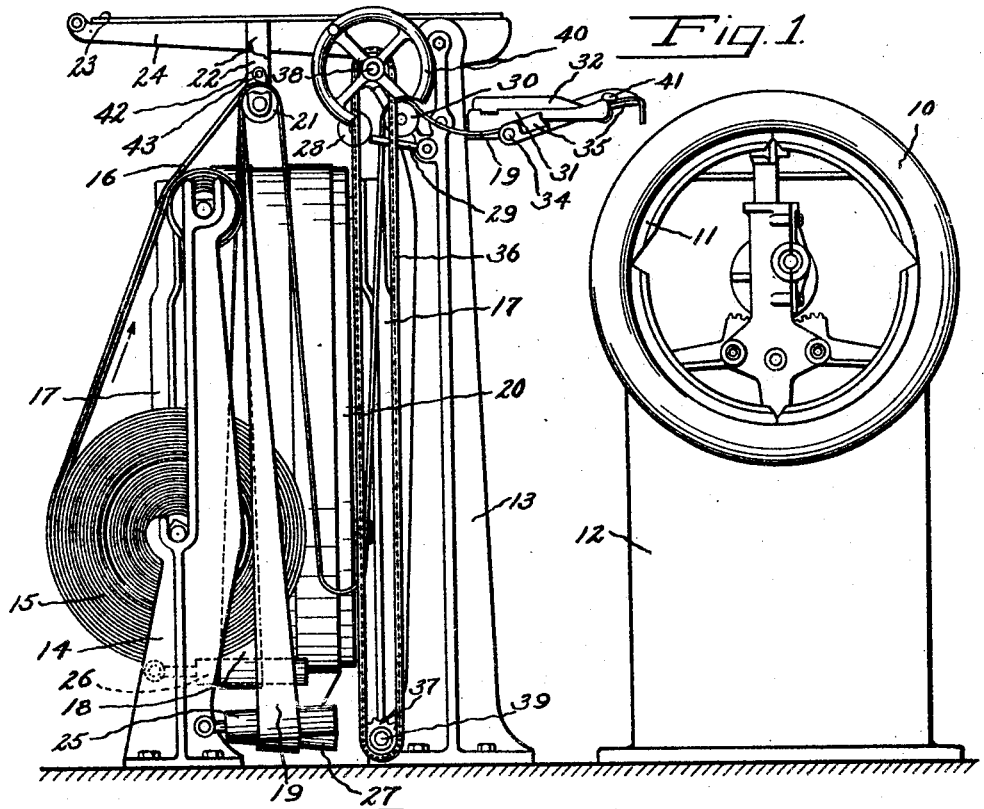
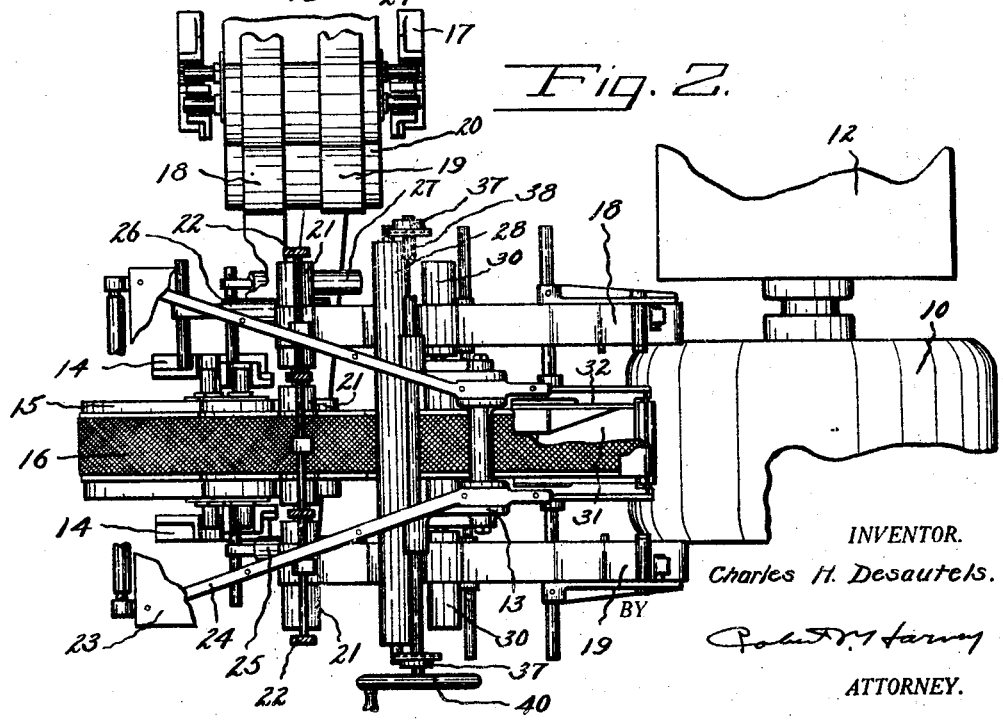
INVENTOR.
Charles H. Desautels.
BY
ATTORNEY.

March 7, 1933.   C. H. DESAUTELS   1,900,435
TIRE BUILDING METHOD
Original Filed March 30, 1928   2 Sheets-Sheet 2
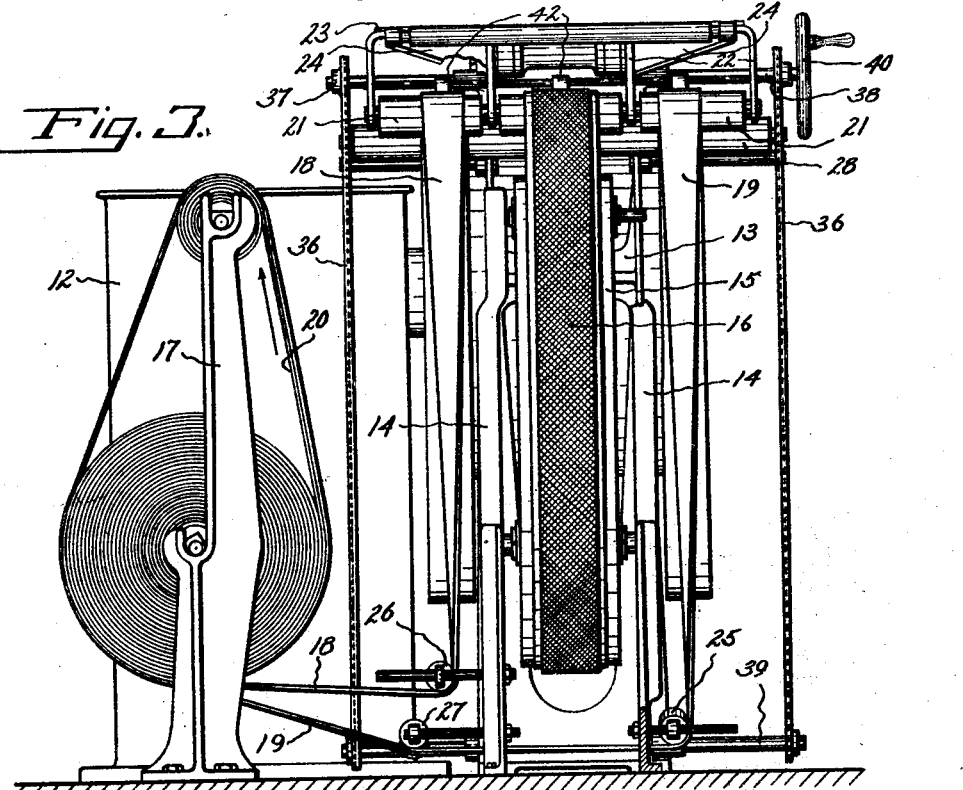
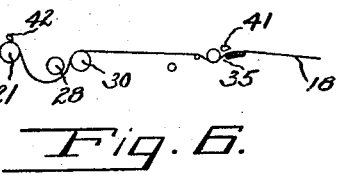
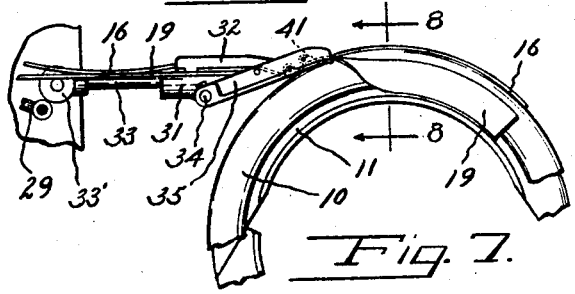
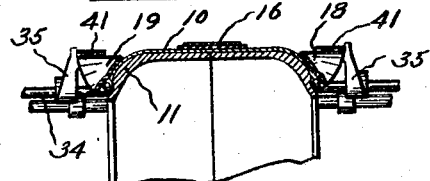
INVENTOR.
Charles H. Desautels.
BY
ATTORNEY.

Patented Mar. 7, 1933

1,900,435

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

TIRE BUILDING METHOD

Original application filed March 30, 1928, Serial No. 265,836. Divided and this application filed August 8, 1929. Serial No. 384,419.

My invention relates to a tire building method useful in the construction of pneumatic tire casings, and more particularly it relates to the manner of applying and guiding strip material onto the tire building drum.

In the construction of pneumatic tires, strips of rubber and rubberized material are used which must, to achieve the best results, be guided smoothly, evenly, and without tension onto the tire. This strip material is usually carried in liners and as the material is drawn from the liners it tends to stick to the latter and stretches in varying degrees, depending on the adherence between the stock and the liner, and if placed directly onto the carcass, as is now customary, the stock in the finished casing would vary from the correct weight, width and thickness.

One object of my invention is to provide a method of handling strips of rubber or rubberized material prior to its incorporation in a tire carcass such that, irrespective of variations in the degree of tackiness of the material and consequent variation in the amount of stretch imparted to the strip as it is pulled from the liner, the strip when built into the tire will be uniform. Means for carrying out my method which may be associated with any conventional type of building machine is disclosed and claimed in my co-pending application Serial No. 265,836, filed March 30, 1928, of which application the present application is a division. Other and further objects will be apparent from the following specification and claim.

Referring to the drawings;

Fig. 1 shows a side elevation of the apparatus in relation to a tire building drum;

Fig. 2 is a plan view of Fig. 1 with certain parts omitted;

Fig. 3 is a view looking in at the left of Fig. 1;

Figs. 4, 5, and 6 are diagrammatic views showing a pre-stretching of the breaker and chafing strip material;

Fig. 7 is a fragmental view showing material being guided onto a tire carcass; and Fig. 8 is a view taken on line 8—8 of Fig. 7.

In the drawings, a tire carcass 10 has been built on the building drum 11 of a tire building machine 12. A standard 13 of the tire building apparatus is located behind the building drum 11 as best shown in Fig. 1. At some distance behind the standard 13 is a pair of supports 14 carrying, in a liner roll 15, plied breaker and padding material 16. Another pair of supports 17 is used for carrying chafing strip material 18 and 19 rolled in a liner 20. These latter supports are placed at right angles to the breaker strip supports 14 for the conservation of space and for ease in supplying the liners to the supports.

The three strips of material, the two chafing strips 18 and 19 and the plied breaker and padding strip 16, are brought over supporting rolls 21 carried in brackets 22. These brackets are fixed to a plate 23 which is supported on a pair of arms 24 fixed in the support 13. Before riding over the rolls 21 the chafing strips 18 and 19 are first carried around adjustable centralizing rolls 25, 26, and 27 and then make a quarter turn before going over the rolls 21. After passing over the rolls 21 the material passes under a vertically actuated roll 28, between adjustable guiding pins 29 and over another set of supporting rolls 30.

The breaker strip 16 is drawn from its supporting roll 30 over a guide 31 having a pair of adjustable flanges 32 adapted to confine the edges of the strip. The guide is slidably held on a pair of rods 33 (see Fig. 7) fixed to a spacer 33' in the standard 13. Adjustably mounted on a rod 34 fixed to the guide 31 is a pair of chafing strip guides 35. The guides 31 and 35 may be moved as a unit from inoperative position as shown in Figs. 1 and 2 to operative position shown in Fig. 7, this latter position bringing the guides as close as possible to the tire carcass under construction.

The vertically actuated roll 28 will, upon its downward movement, draw the stock off the liners as well as cause the stock to stretch as explained above. This stretcher roll 28 is fixed between two lengths of chain 36 riding over sprockets 37 mounted on shafts 38 and 39 in the standard 13 and actuated, as shown, by a handwheel 40, although it may be actuated by power if desired.

Reference to the diagrammatic views, 4, 5 and 6 will illustrate the operation of the roll 28. When the tire builder has finished placing the breaker and chafing strips on a carcass, he operates the handwheel 40 so that the roll 28 will move from its rest position, as shown in Fig 1, down toward the floor carrying a loop of stock with it. Pawls 41 on the guides 31 and 35 will prevent the end of the strips from moving, thus causing the material to be drawn from the liners. The loop of stock is carried dawn a distance designated in Fig. 4 as "a", and the roll 28 is returned to its raised position. Pawls 42, similar to the pawls 41 and set on a rod 43 just above the rolls 21 will hold the stock in this position. By the time the tire builder is again ready to use the breaker and chafing strip material, it will have contracted, if stretched as it was drawn off, to its original length and condition. The length of loop of the contracted material is designated in Fig. 5 as "b". Fig. 6 shows the relation of the breaker and chafing strip material to the supporting rolls after it has been fed about the casing under construction and just before it is cut.

Having thus described my invention, I claim:

The method of preparing material for tire building purposes which comprises drawing a length of the material from a roll into loop form, allowing the material to stretch as it is thus drawn, and then allowing said loop of the material to remain stationary and contract free of tension before it is used.

CHARLES H. DESAUTELS.